United States Patent [19]

Roselle et al.

[11] 3,873,850

[45] Mar. 25, 1975

[54] SOLID-STATE POTENTIOMETER FOR COUPLING CIRCUITS HAVING ISOLATED ELECTRICAL GROUNDS

[75] Inventors: Pierce Clark Roselle, Phoenix; David George Evans, Tempe; Theodore Conrad Ebbinga, Phoenix, all of Ariz.; Robert Franklin Vangen, Minneapolis, Minn.

[73] Assignee: Sperry Rand Corporation, New York, N.Y.

[22] Filed: Jan. 28, 1974

[21] Appl. No.: 437,130

[52] U.S. Cl. .............................. 307/125, 307/235 R

[51] Int. Cl. .............................................. H01h 35/00

[58] Field of Search ................ 307/125, 308, 235 R; 328/134; 73/398 R, 398 AR, 384; 235/194

[56] References Cited

UNITED STATES PATENTS

| | | | |
|---|---|---|---|
| 2,788,664 | 4/1957 | Coulbourn et al. | 73/398 R |
| 3,456,508 | 7/1969 | Frische | 73/398 R |
| 3,784,845 | 1/1974 | Haas | 307/233 |

*Primary Examiner*—Robert K. Schaefer
*Assistant Examiner*—M. Ginsburg
*Attorney, Agent, or Firm*—Howard P. Terry; Thomas J. Scott

[57] ABSTRACT

An electronic circuit including a pulse-width modulator coupled to an oscillator and responsive to a variable amplitude d.c. voltage signal which is representative of shaft displacement on a potentiometer. The output signal produced by the modulator has a variable pulse width proportional to the amplitude of the applied d.c. voltage signal. A light emitting diode responsive to the modulated pulse width signal produces pulses of light energy having variable durations proportional to the variable pulse width of the modulated signal. A photo detector diode responsive to the pulses of light energy produces an isolated signal identical in pulse width to the signal driving the light emitting diode and is coupled to a chopper circuit. The oscillator is also coupled to an isolated power supply which functions as a source of isolated d.c. potential for an input transistor in the chopper circuit. A second isolated power supply (supplied by user) provides a reference voltage, comparable to the reference voltage across the winding of a potentiometer, to the output stage of the chopper which produces a variable duty cycle output voltage. A low pass filter in series with an operational amplifier and an emitter follower are coupled to the output stage of the chopper circuit to provide a variable output impedance from the emitter follower which closely approximates the operation of a potentiometer while the output signal from the emitter follower has an amplitude proportional to the product of the reference voltage and the variable d.c. signal representative of shaft displacement on a potentiometer applied to the pulse width modulator.

12 Claims, 4 Drawing Figures

SOLID-STATE POTENTIOMETER FOR COUPLING CIRCUITS HAVING ISOLATED ELECTRICAL GROUNDS

BACKGROUND OF THE INVENTION

1. Field of the Invention

The subject invention pertains to the field of potentiometers and particularly to solid state potentiometers in which the output circuit is isolated from the input circuit. Heretofore, analog output data has been coupled from sensing circuits such as altimeters to control systems through a mechanical output such as the displacement of a wiper arm on a potentiometer. However, with increasing utilization of integrated solid state circuits in various sensing circuits mechanical output displacements are no longer available to couple the sensed data into user systems. Therefore, alternate type devices to the prior art potentiometers are required.

An additional problem encountered in providing electronic analog devices to replace mechanical type potentiometers is noise present in the user system which could be coupled through ground connections into the sensor apparatus thereby degrading output signals produced by the sensor.

2. Description of the Prior Art

In the prior art sensor or generator means provide analog type outputs in the form of mechanical shaft angle displacements. A reference voltage is applied across the resistive element of a potentiometer and the wiper arm is angularly displaced proportionally to the amplitude of the analog output. The output voltage produced at the wiper arm is related to the reference voltage in accordance with the ratio of that portion of the resistance between the wiper arm and one end of the resistive element and the total resistance of the resistive element. A user or control system is coupled to the wiper arm and the effective resistance of the potentiometer reflected into this system is a function of the resistance ratio which is proportional to the amplitude of the analog type output, i.e., shaft angle displacement. This prior art configuration enables the electrical circuits in the user system which produce the reference voltage and the output voltage to be completely isolated, if desired, from any electrical circuits contained in the sensor or generator means because of the mechanical coupling through the shaft angle displacement.

Presently sensor or generator means provide analog type outputs in the form of variable amplitude direct current voltages. If these outputs are to be coupled through a potentiometer into a user or control system such as a solid-state computer in an aircraft control system, then an intermediate servo will be required to drive the wiper arm of the potentiometer. Alternately, if the potentiometer and the servo are to be replaced by equivalent electrical circuitry, then some means must be provided to isolate the user system from the generator means. Also this means must have an effective variable resistance reflected into the user system which closely approximates the operation of a potentiometer.

The subject invention performs these functions through the use of an isolation transformer, a light coupled isolator circuit and an output circuit including an emitter follower and an operational amplifier that has an effective variable resistance reflected into the user system that closely resembles the function of a potentiometer.

SUMMARY OF THE INVENTION

The input circuit of the subject invention includes an integrator circuit comprised of an operational amplifier in combination with a resistor capacitor network which is coupled to one input of a pulse width modulator. An oscillator providing a sawtooth output voltage is coupled to the second input terminal of the pulse width modulator and the output thereof is a variable pulse width voltage in which each cycle has a constant period but the relative widths of each portion of a cycle are controlled in accordance with the variable amplitude of a d.c. voltage applied to the input of the integrator circuit.

The variable pulse width output signal is applied to the input of a light coupled isolator which includes a light emitting diode that produces pulses of light energy having durations proportional to the first portion of each cycle of the pulse width modulated output signal. The light coupled isolator also includes a photodetector diode which is responsive to the pulses of light energy produced by the light emitting idode and converts these light pulses into a variable pulse width electrical output signal.

A transistorized chopper circuit coupled to the photodetector diode produces a square wave output signal having a variable duty cycle which is identical to the duty cycle of said pulse width electrical signal.

The oscillator output signal is also coupled to a squaring circuit which forms the input to an isolated power supply having its ground connections isolated from the ground connections of the oscillator, pulse width modulator and integrator circuits. An isolation transformer in the output circuit of the isolated power supply includes a rectifier circuit coupled across the secondary of the transformer for producing an isolated direct current voltage that is applied to an input transistor in the chopper circuit and a d.c. power source in the user system provides a reference voltage which is applied across a pair of output transistors in the chopper circuit.

The output voltage from the chopper circuit is the reference d.c. voltage pulse-width modulated in accordance with the output of the pulse-width modulator. This output voltage is coupled through a 5 KHz filter, an operational amplifier and an emitter follower circuit which has an effective variable output resistance to the user system. The output signal from the emitter follower is proportional to the product of the reference voltage in the user system and the amplitude of the variable d.c. voltage applied to the integrator circuit. In addition, the emitter follower has an effective variable output resistance reflected into the user system which varies in accordance with the amplitude of the output signal in a manner analogous to a potentiometer.

DESCRIPTION OF THE PREFERRED EMBODIMENT

Figure 1:
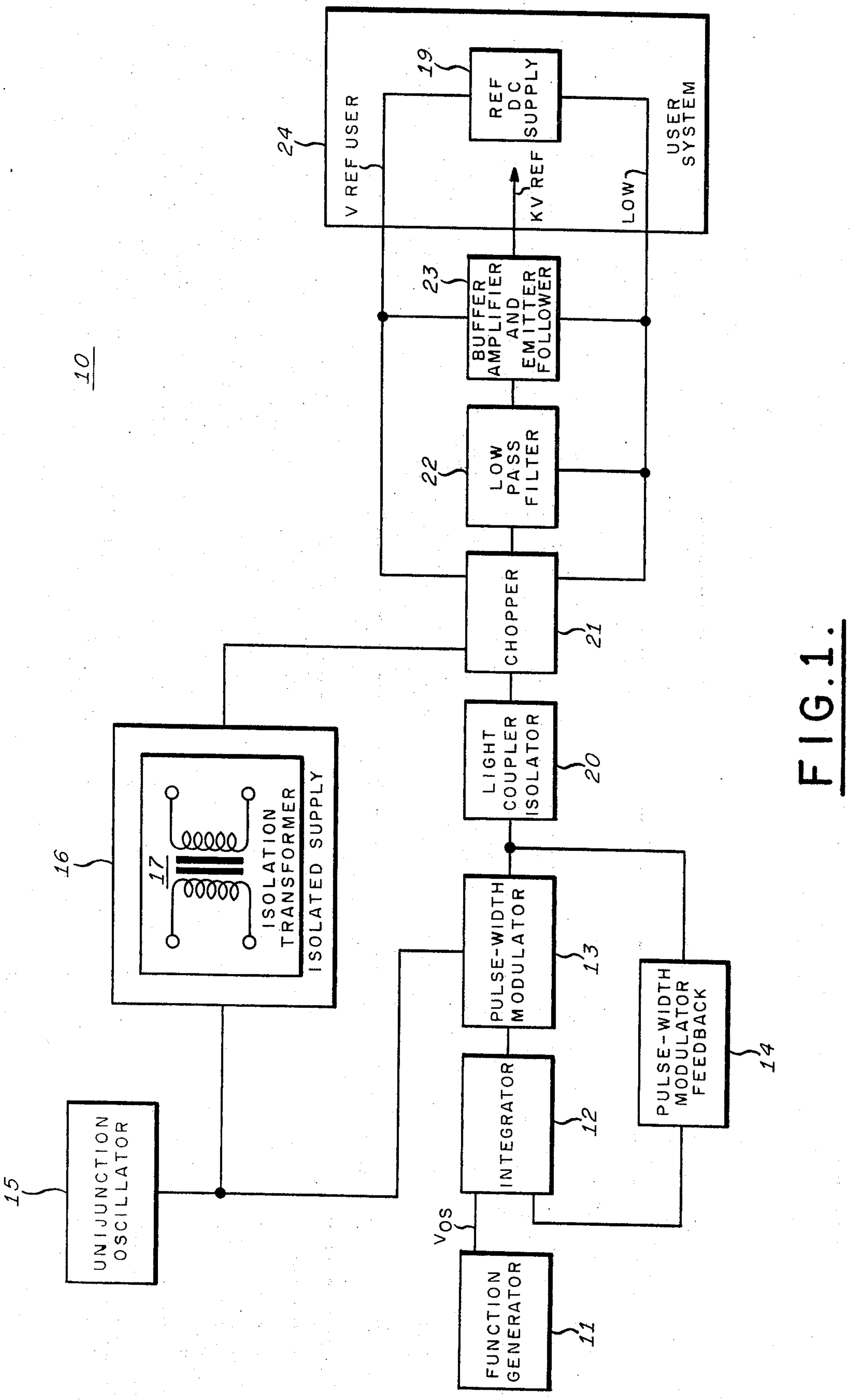
FIG. 1 is a block diagram of an embodiment of the invention.

The invention will be described with respect to FIG. 1. A solid-state potentiometer 10 includes a sensor apparatus 11, such as an altitude responsive device which provides a variable amplitude direct current signal $V_{os}$ that is coupled through an integrator 12 to a first input terminal on a pulse width modulator 13. A second input terminal on the pulse width modulator 13 is coupled to a 5 KHz oscillator 15. The output of the pulse width modulator 13 is coupled through a feedback circuit 14 to a second input terminal on the integrator 12 and to a light coupled isolator 20. The output terminal on the 5 KHz oscillator 15 is also coupled to an isolated power supply 16 which includes an isolation transformer 17. The output voltage from the isolated power supply 16 is a d.c. supply voltage which is applied to a chopper circuit 21. The pulse width modulated output signal from the light coupled isolator 20 is also coupled to the chopper circuit 21. The modulated output signal from the chopper circuit 21 is coupled through a low pass filter 22 and buffer amplifier 23 to the utilization apparatus 24. Thus the variable amplitude input signal $V_{os}$ controls the output voltage coupled into the user system 24 while the isolated supply 16, the isolation transformer 17, and the light coupled isolator 29 function to isolate the ground connections of the user system 24 from the sensor device 11.

Referring to the block diagram in FIG. 1, the operation of the device in general terms is as follows. A control voltage in the form of the applied variable amplitude input signal $V_{os}$ which is proportional to the desired output signal is produced by the sensor 11, coupled through the integrator 12 and applied to a voltage to pulse width modulator 13 which produces a modulated output signal. A light-coupled isolator 20 responsive to the modulated output signal controls the chopper circuit 21 which is referenced to an isolated reference voltage. A resultant variable duty cycle square wave modulated reference voltage signal is produced by the action of the chopper circuit 21 and the square wave modulated reference voltage has a pulse width ratio which is identical to the voltage-to-pulse width modulator output. The square wave modulated reference voltage is then filtered in the low pass filter 22, buffered in the buffer amplifier 23 and coupled to the user system 24.

The preferred embodiment will be described in more specific detail with reference to FIGS. *2a, b* and *c.*

As shown in FIG. *2a,* the applied input signal $V_{os}$ produced by the sensor device 11 is coupled through a resistor 28 to the negative input terminal on an operational amplifier 25 and a first terminal on a capacitor 26. The second terminal on the capacitor 26 is connected to the output terminal of the operational amplifier 25 and the first terminal on a resistor 27. The second terminal on the resistor 27 is connected to a common junction of the base terminal, *b,* on a transistor 30, a first terminal on a resistor 32 and the first terminal on a resistor 33. The second terminal on the resistor 33 is coupled to a ground connection designated ⏚ and the second terminal on the resistor 32 is coupled to a source of reference voltage $+V_o$. The emitter, *a,* on the transistor 30 is coupled to the junction of a collector terminal, *c,* on a transistor 34 and a first terminal on a resistor 31 which has its second terminal connected to the source of reference voltage $+V_o$. The emitter terminal, *a,* of the transistor 34 is connected to the ground ⏚.

The collector terminal, *c,* on the transistor 30 is coupled to the junction of a first terminal on a resistor 35 and the base terminal, *b,* of a transistor 36 which comprises the input of a pulse width modulator feedback circuit 14. The collector terminal, *c,* on the transistor 36 is connected to the first terminal on a resistor 38 which has its second terminal connected to ground ⏚. The emitter terminal, *a,* is connected to a junction of the second terminal on the resistor 35, a first terminal on a resistor 41, the emitter terminal, *a,* on a transistor 37 and a source of negative potential $-V_o$.

The second terminal on the resistor 41 is coupled to the junction of the base terminal, *b,* of the transistor 37 and a first terminal on a resistor 40. The second terminal on the resistor 40 is coupled to the junction of the first terminal on the resistor 38, the collector terminal, *c,* of the transistor 36 and the anode on a diode 50. The collector terminal, *c,* on the transistor 37 is coupled to the junction of resistors 42 and 43. The second terminal on the resistor 42 is connected to a source of positive potential $+V_o$ and the second terminal on the resistor 43 is connected to the junction of the base terminals, *b,* on transistors 44 and 45. The emitter terminals, *a,* on these transistors are connected together and to a resistor 46 which has its other terminal connected to one side of a capacitor 47 and the positive input on the operational amplifier 25. The second terminal on the capacitor 47 is connected to ground ⏚ along with the collector terminal, *c,* on the transistor 44 while the collector terminal, *c,* on the transistor 45 is connected to the source of negative potential $-V_o$.

The cathode terminal of the diode 50 is connected to a resistor 83 in FIG. *2c* which has its second terminal connected to the source of negative potential $-V_o$. A light emitting diode 84 in the light coupled isolator 20 has its cathode connected to the source of negative potential $-V_o$ and its anode connected to the junction of the resistor 83 and the cathode of the diode 50. A photodetector diode 85 which is responsive to light energy emitted from the light emitting diode 84 has its cathode coupled to ground ⏚ and its anode connected to the base terminal, *b,* on a transistor 86 which, along with the diodes 84 and 85, is also disposed within the light coupled isolator 20. The collector terminal, *c,* on the transistor 86 is connected to the junction of a resistor 87 and a first terminal on a capacitor 91. The other terminal on the resistor 87 is connected to ground ⏚.

The base terminal, *b,* on the transistor 34 in FIG. *2a,* is coupled to the emitter terminal, *a,* on a unijunction transistor 54 in FIG. *2b* which is also coupled to the junction of the drain terminal, *b,* on field effect transistor 51, a capacitor 53 and a collector terminal, *c,* on a transistor 52. The field effect transistor 51 has its gate terminal, *a,* connected to its drain terminal, *b,* and has its source terminal, *c,* connected to a source of positive potential $+V_o$. The second terminal on the capacitor 53 is connected to ground ⏚ along with the emitter terminal, *a,* on a transistor 52. The second base terminal, *c,* on the unijunction transistor 54 is coupled through a resistor 55 to a source of positive potential $+V_o$ and the second base terminal, *b,* thereon is coupled to the junction of a capacitor 56 and resistors 57 and 61. The other terminal on the capacitor 56 is connected to ground and the other terminal on the resistor 57 is connected to the junction of the base terminal, *b*, of the transistor 52 and a resistor 60 which has its second terminal connected to ground 1.

The resistor 61 has its second terminal connected to the base terminal, *b*, on transistor 62 which couples the output signal from the oscillator 15 into the isolated supply 16. The emitter terminal, *a*, of transistor 62 is connected to ground 1 and the collector terminal, *c*, is coupled through a resistor 63 to the source of positive potential $+V_o$. The collector terminal, *c*, on the transistor 62 is also coupled to a terminal 1 on an integrated flip-flop element 64 in the isolated supply 16 which is used to provide a source of d.c. potential and has two isolated ground terminals 2 and 3. The ground terminals 2 may be connected to the ground terminals 1 in the oscillator 15, modulator 14 and function generator 11 whereas the ground terminals 3 may be connected to ground terminals in the user system 24. Alternately, the isolated supply 16 could be eliminated and replaced by a separate d.c. supply in the user system 24 without any connection whatever to the oscillator 15.

Terminals 2, 3, 4 and 5 on the integrated flip-flop element 64 are connected together and coupled through a resistor 65 to a center tap $+V_p$ on the isolation transformer 17. Terminal 8 is connected to ground 2 and terminal 6 and 7 are coupled through resistors 66 and 67 respectively into a pair of transistors connected in a push pull amplifier arrangement with the primary of the isolation transformer 17. The resistor 66 is connected to the junction of a resistor 70 and the base terminal, *b*, on a transistor 72. The resistor 67 is connected to the junction of a resistor 71 and the base terminal of a transistor 73. The other terminals of the resistors 70 and 71, along with the emitter terminals, *a*, of transistors 72 and 73 are connected to ground 2. The collector terminals, *c*, of the transistors 72 and 73 are connected to respective first and second terminals on the primary winding of the isolation transformer 17.

The secondary winding of the isolation transformer 17 has a center tap connected to ground 3 and its first and second terminals connected to a full wave rectifier comprised of diodes 75, 76, 77 and 80. In this rectifier the junction of the cathode on the diode 75 and the anode on the diode 76 is connected to the first terminal on the secondary winding of the transformer 17 and the junction of the anode of the diode 77 and the cathode on the diode 80 is connected to the second terminal on the secondary winding of the transformer 17. The junction of the cathodes on the diode 76 and 77 is connected to one terminal on a capacitor 81 and the junction of the anodes on the diode 75 and 80 are connected to a first terminal on a capacitor 82. The second terminals on the capacitors 81 and 82 are connected to ground 3. The first terminals on the capacitors 81 and 82 are designated A and B respectively. The voltage between these terminals functions as a source of isolated d.c. power applied across the chopper 21 as shown in FIG. 1.

Figure 2A:
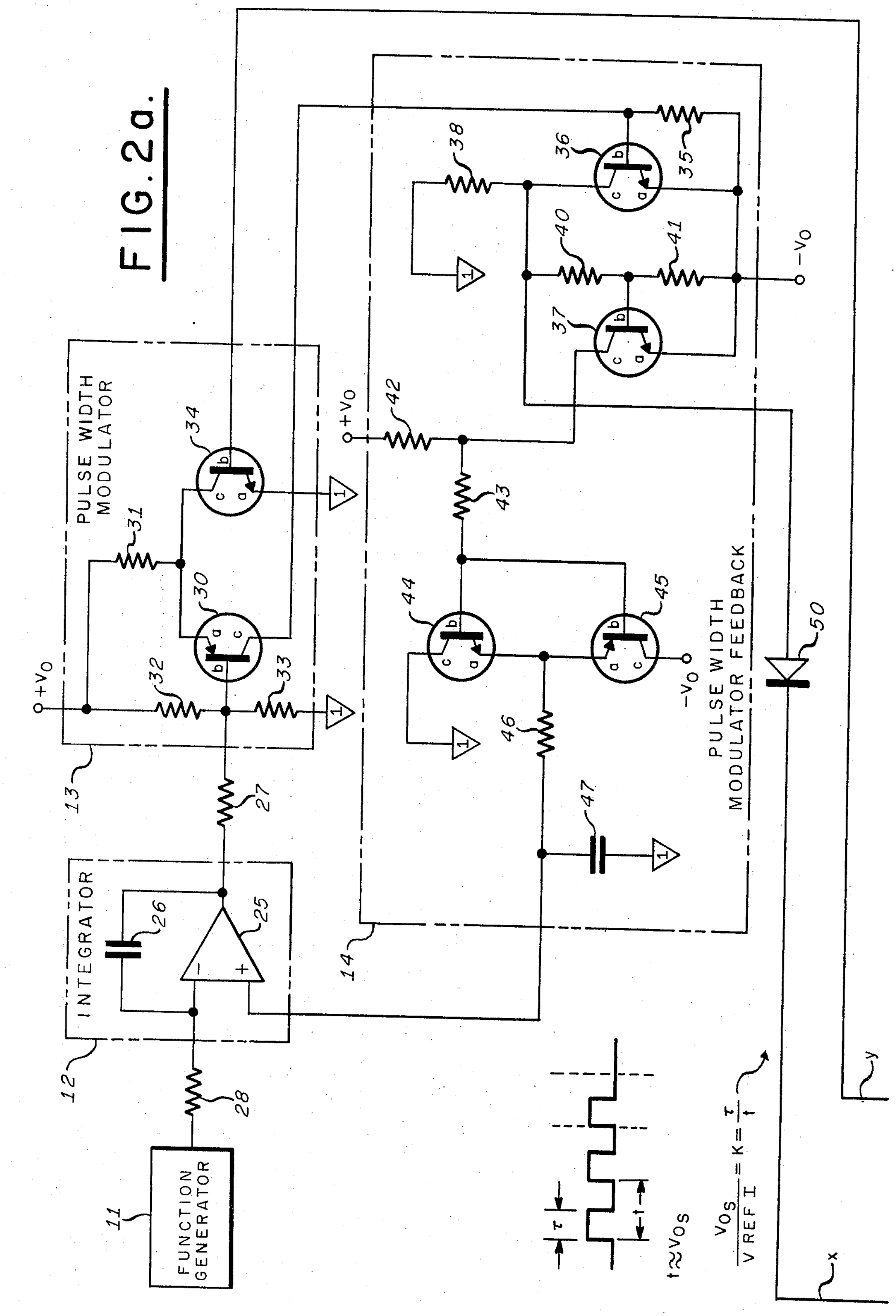
FIG. 2*a* is a partial schematic diagram of the invention illustrating the integrator, pulse width modulator and pulse width modulator feedback circuits.
Figure 2B:
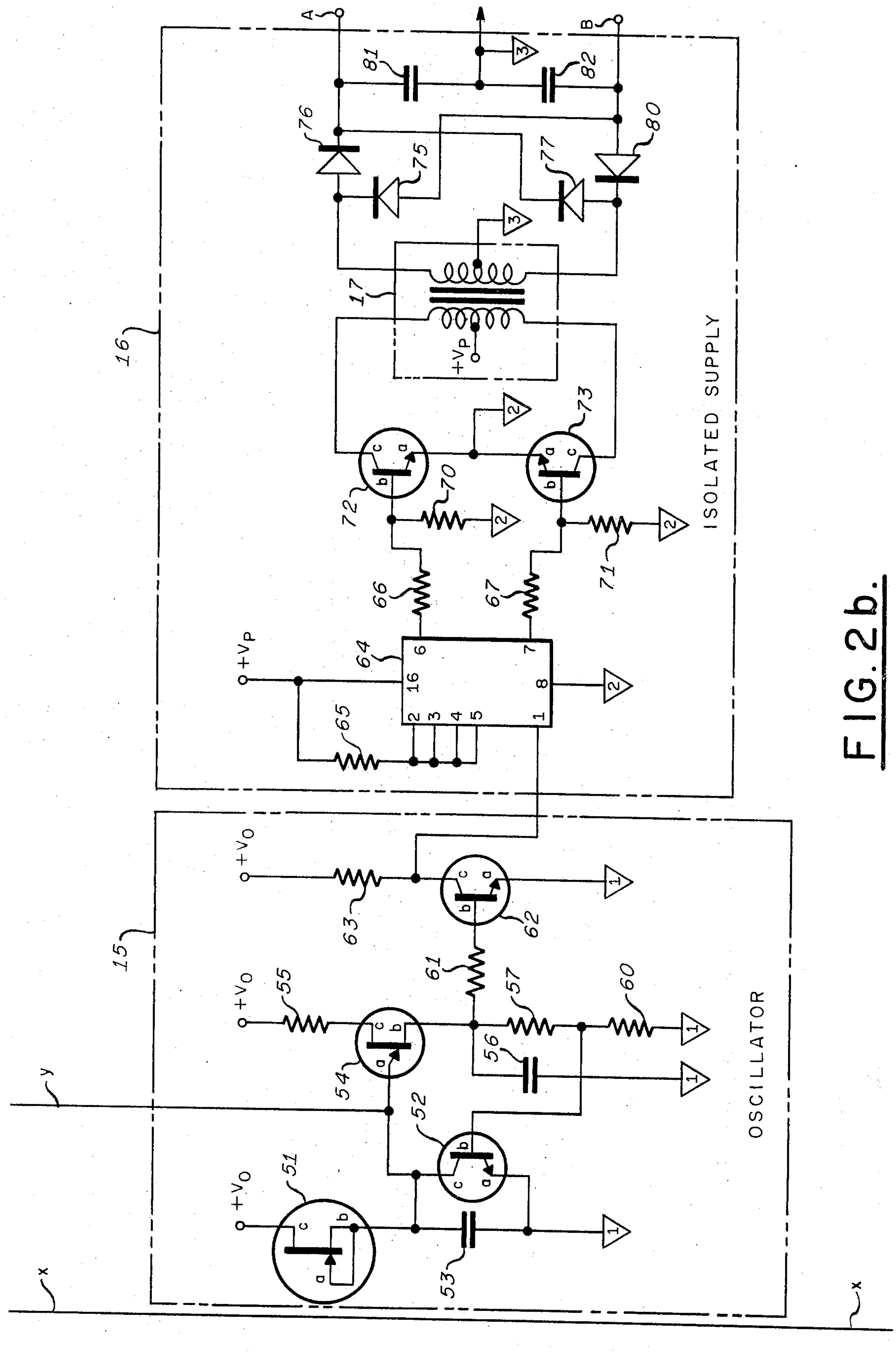
FIG. 2*b* is a partial schematic diagram of the invention illustrating the oscillator and isolated supply.
Figure 2C:
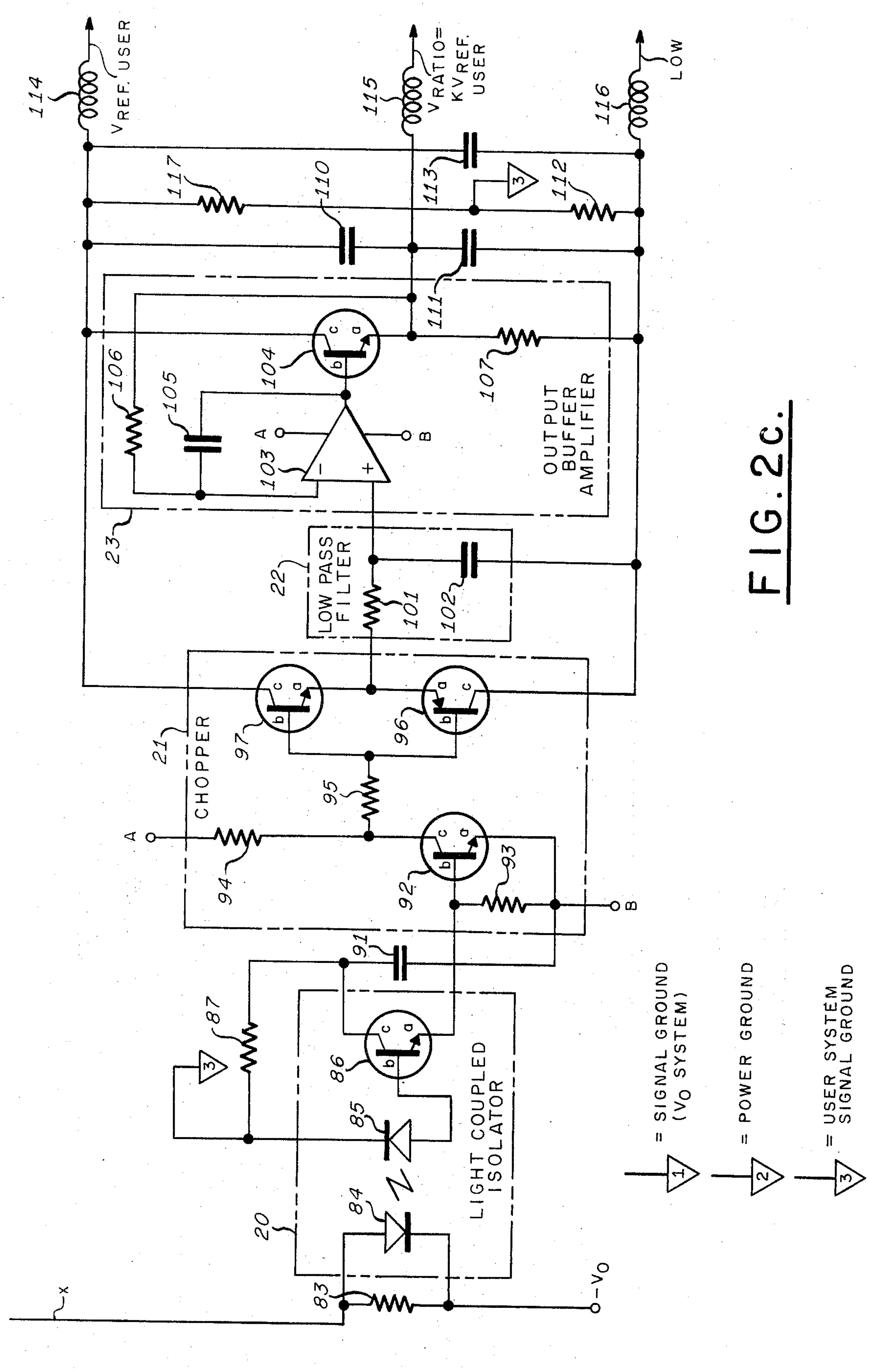
FIG. 2*c* is a partial schematic diagram of the invention illustrating a light coupled isolator, chopper and output circuits.

In FIG. 2*c* the second terminal on the capacitor 91 is connected to the junction of a resistor 93 and the emitter terminal, *a*, of a transistor 92 in the chopper 21. This junction is coupled to the terminal B. The collector terminal, *c*, of the transistor 92 is coupled through a resistor 94 to the terminal A. A coupling resistor 95 has a first terminal coupled to the junction of the collector terminal, *c*, on the transistor 92 and the resistor 94 and a second terminal coupled to the base terminals, *b*, on respective transistors 96 and 97 forming part of the chopper circuit 21. The emitter terminal, *a*, of the transistors 96 and 97 are connected together and coupled through a low pass filter 22 comprised of a resistor 101 and a capacitor 102, the junction therebetween being coupled to the positive terminal of an operational amplifier 103 in the output buffer amplifier 23. The collector terminal, *c*, on the transistor 96 is coupled to the second terminal on the capacitor 102 and the first terminal on an inductor 116 while the collector terminal, *c*, on the transistor 97 is coupled to the first terminal on an inductor 114. The operational amplifier 103 is coupled to the isolated d.c. supply at the reference terminals A and B. The output terminal of the operational amplifier 103 is coupled through a feedback capacitor 105 to the negative input terminal on the amplifier. A base terminal, *b*, of a transistor 104 is also coupled to the output terminal of the operational amplifier 103. The emitter terminal, *a*, on the transistor 104 is coupled through a resistor 107 to the first terminal on the inductor 116 and the collector terminal, *c*, is coupled to the first terminal on the inductor 114.

The value of the resistor 107 is determined from the user system reference voltage supply load such that the loading reflected into the user system 24 from the output of the emitter follower approximates the effective impedance that would be reflected by an electromechanical potentiometer.

The junction of the emitter terminal, *a*, on transistor 104 and resistor 107 is also coupled through feedback resistor 106 to the negative input terminal on the operational amplifier 103. The emitter terminal, *a*, of the transistor 104 is the output terminal of the emitter follower which is also coupled through an inductor 115 to provide the output signal of the solid state potentiometer, $V_{ratio} = KV_{ref.\ user}$.

Bypass capacitors 110, 111 and 113 are coupled between the first terminals on inductor 115 and 114, 115 and 116, and 114 and 116 respectively. Output resistors 112 and 117 have their first terminals connected to ground 3 and their second terminals connected to the first terminals on the inductors 116 and 114 respectively. The reference voltage for the user system 24 is applied across the second terminal on the inductor 114, designated $V_{ref\ user}$, and the second terminal on inductor 116, designated Low.

In operation, the function generator 11 which may be an altitude pressure sensor of the type disclosed in U.S. pat. No. 3,456,508, entitled "Vibrating Diaphragm Pressure Sensor Apparatus" issued July 22, 1969 in the name of R. H. Frische, in combination with a Linear Frequency to Voltage Converter Circuit, Ser. No. 330,129, filed Feb. 6, 1973 in the name of George C. Haas, both of which are assigned to the assignee of the subject application, produces a variable amplitude d.c. voltage signal designated $V_{os}$. This signal is coupled through the resistor 28 into the negative input terminal on the operational amplifier 25 in the integrator 12 as shown in FIG. 2*a*. The integrated output signal from the operational amplifier 25 is coupled through the resistor 27 into the base terminal, *b*, of the transistor 30 in the pulse width modulator 13.

The oscillator 15 shown in FIG. 2*b* including the field effect transistor 51 controls the rate of charge accumulated on the capacitor 53 from the reference supply $+V_o$. When the voltage across the capacitor 53 reaches the firing voltage of the unijunction transistor 54, the capacitor 53 is discharged through the resistors 57 and 60. The transistor 52 coupled to the junction of the resistors 57 and 60 is rendered conducting at this time thereby completely discharging the capacitor 53. At the end of the discharge period the uni-junction transistor 54 is cut off returning the point between the resistors 57 and 60 to ground which also cuts off the transistor 52 and the capacitor 53 begins to recharge through the field effect transistor 51. This cycle of operation produces a sawtooth voltage at the gate terminal, *a*, on the unijunction transistor 54 which is coupled into the base terminal, *b*, of the transistor 34 in the pulse width modulator unit 13. The output of the pulse width modulator unit 13 is taken from the collector terminal of the transistor 30 and is a substantially square wave output signal having a constant period, *t*, equal to the period of the sawtooth output voltage from the oscillator 15. However, the duration of the respective positive and negative portions of each cycle are proportional to the amplitude of the variable amplitude d.c. signal coupled into the base terminal, *b*, of the transistor 30. The positive portion of each cycle is designated $\tau$ and the ratio $\tau$ to the period t is represented by K such that $\tau/t = K$.

The square wave output signal from the pulse width modulator 13 is coupled through the amplifier stages including the transistors 36 and 37 in the pulse width modulator feedback circuit 14 to the filter comprised of the transistors 44, 45, the resistor 46 and capacitor 47. The voltage on the capacitor 47 is proportional to the duration of the positive portion of each cycle, $\tau$, and is coupled into the positive terminal on the operational amplifier 25 where it is subtracted from the variable amplitude d.c. input signal and the resulting error signal is coupled back through the capacitor 26 to the negative input terminal on the operational amplifier 25. The output of the integrator 12 then changes to reduce the error signal to zero.

The modulated pulse width output signal from the modulator 13 is coupled from the collector terminal, *c*, on the transistor 36 through a coupling diode 50 and a resistor 83 to a source of potential $-V_o$. As shown in FIG. 2*c*, the light emitting diode 84 in the light coupled oscillator 20 is coupled across the resistor 83 and produces pulses of light energy having durations proportional to the positive portions, $\tau$, of the square wave output signal from the transistor 36. A photodetector diode 85 responsive to the pulses of light energy emitted by the light emitted diode 84 produces a pulse width modulated signal which is coupled through a transistor 86 in the light coupled isolator 20 to a transistor 92 in the chopper circuit 21.

The pulses of light energy coupled between the light emitting diode 84 and the photodetector diode 85 are non-electrically connected signals which maintain the duty cycle ratio between each of the electrically connected pulse width modulated signals produced by the modulator 13 and the chopper circuit 21 while eliminating any physical electrical connection between the modulator 13 and the chopper circuit 21.

The turn-on time of the transistor 92 is reduced through the action of the capacitor 91 which couples additional current to the base terminal, *b*, of the transistor 92 through the base resistor 93.

The chopper circuit 21 includes the terminal A coupled through the resistor 94 to the collector terminal, *c*, on a transistor 92 and the terminal B coupled through the resistor 93 to the emitter terminal, *a*, on the transistor 92. In this embodiment an isolated d.c. reference voltage is applied to the terminals A and B from an isolated supply 16 which receives a.c. energy from the oscillator 15. When the unijunction transistor 54 conducts and discharges the capacitor 53 through the resistors 57 and 60 to the ground 1, the alternating signal at the gate, *b*, of the unijunction transistor 54 is coupled through the resistor 61 to the base terminal, *b*, of an output transistor 62 in the oscillator 15. The collector terminal, *c*, of the transistor 62 is coupled to a source of positive potential $+V_o$ through a resistor 63 and the resulting a.c. energy produced at the collector terminal, *c*, of the transistor 62 is coupled into the input terminal ▽1 of an integrated circuit multivibrator 64. The output terminals 6 and 7 of the multivibrator 64 couple the a.c. energy through the respective circuits connected in push-pull amplifier configuration with the primary winding of the isolation transformer 17. The ground terminals in the circuitry on the primary side of the isolation transformer 17 are designated ▽2 and are kept separate from the ground terminals ▽1 in the oscillator 15, the pulse width modulator feedback circuit 14, the pulse width modulator 13 and the integrator 12 in order to reduce the amplitude of noise which produces ripple on the output voltage across the terminals A, B of the isolated supply 16. However, the ground terminals ▽1 and ▽2 are connected together at one point so that they are at the same potential. Further, the ground terminals ▽1 and ▽2 may be common at more than one point if the ripple requirement on the output voltage at the terminals A and B is not stringent.

The circuitry including the full wave rectifier comprised of the diodes 75, 76, 77 and 80 in combination with the capacitors 81 and 82 connected to the secondary winding of the isolation transformer 17 is referenced to a ground terminal ▽3 which is completely isolated from the ground terminals ▽1 and ▽2. Thus a potential difference may exist between the ground terminal ▽3 and the other grounds in the system.

Alternatively the d.c. potential between the terminals A and B on the isolated supply 16 may be produced by a completely separate d.c. supply in the user system without any connection whatever to the oscillator 15. In the present embodiment the isolated supply 16 was employed as a convenience feature because of the availability of the a.c. energy from the oscillator 15. The transistor 92 in the chopper circuit 21 produces a square wave output voltage having an amplitude referenced to the d.c. voltage applied at the terminals A, B and a period t having a positive portion $\tau$ which provides a duty cycle equal to the duty cycle of the square wave output signal produced by the pulse width modulator unit 13.

The square wave signal produced by the transistor 92 is coupled through the resistor 95 to the base terminal *b* on the transistors 96 and 97 which have their respective collector terminals, *c*, coupled to a source of reference voltage designated $V_{ref.user}$ and Low through the inductors 114 and 116 respectively. This reference voltage from the user system, i.e., $V_{rev.user}$ and Low, is the same voltage that is applied to the winding terminals of a potentiometer in an electro-mechanical coupling circuit. Thus a square wave output voltage referenced to the reference voltage of the user system is produced at the emitter terminals, *a*, of the transistors 96 and 97. This square wave output voltage is coupled through the low pass filter 22 comprised of the resistor 101 and the capacitor 102 which produces a low frequency a.c. signal that is coupled to the positive terminal on the operational amplifier 103 in the output buffer amplifier 23.

The low frequency a.c. signal produced at the output of the operational amplifier 103 is coupled through a feedback capacitor 105 to the negative input terminal on the operational amplifier 103 where it is combined with the feedback signal coupled through the resistor 106 from the emitter terminal, *a*, on the transistor 104 of the emitter follower in the output buffer amplifier 23. The combined feedback signals from the capacitor 105 and resistor 106 are subtracted from the variable amplitude low frequency output signal from the low pass filter 22. The operational amplifier 103 and the low pass filter 22 act as a power coupler into the base terminal, *b*, of the transistor 104. The resistor 107 which together with the transistor 104 forms the emitter follower in the output buffer amplifier is selected according to the desired resistance characteristic across the input terminals of the emitter follower, i.e., from the base terminal, *b*, of the transistor 104 to the low side of the capacitor 102 with no load coupled across the output terminals of the inductors 114 and 116. This configuration is analogous to an open wiper arm on a potentiometer, i.e., no contact between the wiper arm and potentiometer winding.

Coupling the emitter follower between the reference voltage terminals of the user system allows the emitter follower to be driven by the power coupler circuitry of the solid-state potentiometer while providing the current for the output signal from the reference voltage in the user system in place of the voltage from the power coupler, i.e., the d.c. voltage across the terminals A, B.

The output d.c. voltage produced at the junction between the emitter terminal, *a*, of the transistor 104 and the resistor 107 is coupled through the inductor 115 to the user system. The output voltage $V_{ratio} = KV_{ref.user}$ in which $K = \tau/t$. The desired characteristic of the output voltage is not necessarily the magnitude of the signal $V_{ratio}$ but rather the ratio of $V_{radio}/V_{ref.user}$.

In one embodiment of the subject invention the frequency of the oscillator 15 and the frequency of the square wave produced by the chopper circuit 21 was 5 KHz and the break point frequency of the low pass filter 22 was 22.7 Hz.

From the foregoing detailed description of the invention with respect to FIGS. 2*a*, *b*, *c*, it will be appreciated that the light coupled isolator 20 provides isolation between the ground terminals 1 and 2 on the light emitting diode 84 side and the ground terminal 3 on the photodetector 85 side while preserving the duty cycle integrity of the square wave signal produced by the pulse width modulator 13 and the square wave signal produced by the chopper circuit 21. Further, in the disclosed embodiment the isolation transformer 17 provides isolation for the source of potential between the ground connections 1, 2 and 3.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A solid-state potentiometer which couples an applied variable amplitude d.c. voltage signal from a function generator to a utilization apparatus while isolating electrical connections thereby comprising frequency source means for providing a reference frequency signal having a predetermined period, first modulator means coupled to said frequency source means and said function generator for producing a first electrical pulse-width modulated signal having a frequency of said predetermined period and a duty cycle proportional to said variable amplitude of said applied d.c. voltage signal, isolated coupler means responsive to said first electrical pulse-width modulated signal for producing a non-electrical modulated signal and including means responsive to said non-electrical modulated signal for producing a second electrical pulse-width modulated signal which is electrically isolated from said first electrical pulse-width modulated signal and has a duty cycle proportional to said variable amplitude of said applied d.c. voltage signal, d.c. voltage source means coupled to said utilization apparatus and said isolated coupler means for applying a reference d.c. voltage to said isolated coupler means thereby producing a pulse-width modulated signal referenced to said reference d.c. voltage, and converter means coupled to said isolated coupler means, said d.c. voltage source means and said utilization apparatus for converting said pulse-width modulated signal referenced to said reference d.c. voltage to a variable amplitude d.c. voltage signal referenced to said reference d.c. voltage and having an amplitude proportional to said variable amplitude of said applied direct current signal and an effective variable output resistance reflected into said utilization apparatus which varies in accordance with said variable amplitude in a fashion substantially similar to a potentiometer.

2. A solid-state potentiometer as recited in claim 1 in which said frequency source means includes a unijunction transistor oscillator which provides a sawtooth reference frequency signal.

3. A solid-state potentiometer as recited in claim 1 in which said first modulator means includes integrator means responsive to said applied variable amplitude d.c. voltage signal and pulse width modulator feedback means coupled to said integrator means for providing a d.c. voltage signal proportional to said duty cycle of said first electrical pulse-width modulated signal which is combined in said integrator means with said applied variable amplitude d.c. voltage signal to produce a difference d.c. voltage signal.

4. A solid-state potentiometer as recited in claim 1 in which said first modulator means includes an NPN transistor and a PNP transistor in which said reference frequency signal is applied to the base terminal on said NPN transistor and said d.c. voltage signal is applied to the base terminal on said PNP transistor.

5. A solid-state potentiometer as recited in claim 1 in which said isolated coupler means includes a light emitting diode responsive to said first electrical pulse width modulated signal for producing a non-electrical modulated signal.

6. A solid-state potentiometer as recited in claim 1 in which said isolated coupler means includes photodetector diode means responsive to said non-electrical modulated signal and transistor means coupled to said photodetector diode for producing a second electrical pulse-width modulated signal which is electrically isolated from said first electrical pulse width modulated signal.

7. A solid-state potentiometer as recited in claim 1 in which said isolated coupler means further includes chopper circuit means responsive to said second electrical pulse-width modulated signal and coupled to said d.c. voltage source means for producing a pulse-width modulated signal referenced to said reference d.c. voltage.

8. A solid-state potentiometer as recited in claim 1 in which said converter means includes low pass filter means responsive to said pulse-width modulated signal referenced to said reference d.c. voltage for producing a variable amplitude d.c. voltage signal referenced to said reference d.c. voltage.

9. A solid-state potentiometer as recited in claim 8 in which said converter means further includes an operational amplifier in series with an emitter follower and coupled to said low pass filter means for providing a variable amplitude d.c. voltage signal referenced to said reference d.c. voltage having an effective variable output resistance which varies in accordance with said variable amplitude in a fashion substantially similar to a potentiometer.

10. A method for electronically coupling a variable amplitude d.c. signal from a function generating circuit into a utilization apparatus comprising the steps of producing an alternating current frequency signal, pulse width modulating said alternating current frequency signal in accordance with the instantaneous value of said variable amplitude d.c. signal to produce a first pulse-width modulated signal having a period equal to the period of said alternating current frequency signal and a duty cycle proportional to the instantaneous amplitude of said variable amplitude d.c. signal, producing a non-electrical modulated signal in response to said pulse-width modulated signal, producing a second pulse-width modulated signal in response to said non-electrical modulated signal which is electrically isolated from said first pulse-width modulated signal and has a duty cycle proportional to said variable amplitude d.c. signal, converting said second pulse-width modulated signal into an output variable amplitude d.c. voltage signal referenced to a d.c. voltage in said utilization apparatus and having an amplitude proportional to said variable amplitude d.c. signal, and providing an effective variable output resistance reflected into said utilization apparatus which varies in accordance with said variable amplitude of said output d.c. signal referenced to said utilization apparatus in a fashion substantially similar to a potentiometer.

11. A method for electronically coupling a variable amplitude d.c. signal from a function generating circuit into a utilization apparatus as recited in claim 10 wherein the step of producing a non-electrical modulated signal includes:

producing pulses of light energy in response to said pulse-width modulated signal, and the step of producing said second pulse-width modulated signal includes:

converting said pulses of light energy into pulse width modulated electrical signals.

12. A method for electronically coupling a variable amplitude d.c. signal from a function generating circuit into a utilization apparatus as recited in claim 10 wherein the step of converting said second pulse-width modulated signal into an output variable amplitude d.c. voltage signal referenced to d.c. voltage includes:

applying said d.c. voltage across a chopper circuit which is driven by said second pulse-width modulated signal, to produce a square wave output signal, filtering said square wave output signal from said chopper circuit to provide a low frequency pulse-width modulated signal, and integrating said low frequency pulse-width modulated signal to produce an output variable amplitude d.c. voltage signal referenced to a d.c. voltage in said utilization apparatus.

* * * * *